(12) United States Patent
Zhang et al.

(10) Patent No.: US 10,406,472 B2
(45) Date of Patent: Sep. 10, 2019

(54) COLLAPSIBLE AIR FILTER

(71) Applicant: 3M INNOVATIVE PROPERTIES COMPANY, St. Paul, MN (US)

(72) Inventors: Zhiqun Zhang, Roseville, MN (US); Andrew R. Fox, Oakdale, MN (US); Matthew T. Scholz, Woodbury, MN (US); Gene B. Portelli, Lake Elmo, MN (US); Nicolas A. Echeverri, Woodbury, MN (US); Amanda B. Dauphinais, Eagan, MN (US); Leonard M. Martinez, Hugo, MN (US); Stephen M. Sanocki, Hudson, WI (US); Kannan Seshadri, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 372 days.

(21) Appl. No.: 15/040,192

(22) Filed: Feb. 10, 2016

(65) Prior Publication Data

US 2016/0263515 A1      Sep. 15, 2016

Related U.S. Application Data

(60) Provisional application No. 62/131,917, filed on Mar. 12, 2015.

(51) Int. Cl.
*B01D 46/52* (2006.01)
*B01D 46/00* (2006.01)
*B01D 46/10* (2006.01)

(52) U.S. Cl.
CPC ....... *B01D 46/523* (2013.01); *B01D 46/0032* (2013.01); *B01D 46/10* (2013.01); *B01D 2275/203* (2013.01)

(58) Field of Classification Search
CPC ...... B01D 46/10; B01D 46/32; B01D 46/523; B01D 2275/203
See application file for complete search history.

(56) References Cited

U.S. PATENT DOCUMENTS

| 4,439,219 | A | * | 3/1984 | Lambrecht | ......... | B01D 46/0005 248/231.21 |
| 4,667,661 | A | | 5/1987 | Scholz | | |
| 4,758,460 | A | * | 7/1988 | Spicer | .................... | B01D 39/14 427/244 |

(Continued)

*Primary Examiner* — Amber R Orlando
(74) *Attorney, Agent, or Firm* — Kenneth B. Wood

(57) ABSTRACT

The present disclosure generally relates to air filters expandable from a collapsed arrangement to an expanded, end-use arrangement and to methods of making, using, and installing such air filters. Some embodiments relate to an air filter having an expanded state and a collapsed state. The air filter includes a filter media assembly including (1) filter media including a plurality of pleats, (2) first and second opposing sides, and (3) first and second opposing ends. The air filter also includes a shape retention structure capable of being connected to at least a portion of the filter media assembly and capable of retention the filter media assembly in the expanded state. A spacing distance between adjacent pleats in the filter media is greater in the expanded state of the air filter than in the collapsed state of the air filter. In some embodiments, the air filter is an HVAC air filter.

22 Claims, 3 Drawing Sheets

(56) References Cited

U.S. PATENT DOCUMENTS

| | | | |
|---|---|---|---|
| 5,022,901 A * | 6/1991 | Meunier | A62B 23/02 55/502 |
| 5,273,564 A | 12/1993 | Hill | |
| 5,486,410 A | 1/1996 | Groeger | |
| 5,540,652 A | 7/1996 | Callinan | |
| 5,597,645 A | 1/1997 | Pike | |
| 5,662,728 A | 9/1997 | Groeger | |
| 5,968,217 A * | 10/1999 | Stein | B01D 46/0002 55/496 |
| 5,972,808 A | 10/1999 | Groeger | |
| 6,057,256 A | 5/2000 | Krueger | |
| 6,740,137 B2 | 5/2004 | Kubokawa | |
| 6,858,297 B1 | 2/2005 | Shah | |
| 7,037,354 B1 * | 5/2006 | Dimicelli | B01D 46/0002 55/497 |
| 7,169,202 B2 | 1/2007 | Kubokawa | |
| 7,497,888 B2 * | 3/2009 | Ashwood | B01D 46/10 55/481 |
| 7,537,630 B2 * | 5/2009 | Schuld | B01D 46/0005 55/495 |
| 7,622,063 B2 * | 11/2009 | Sundet | B01D 39/1623 264/13 |
| 7,695,660 B2 | 4/2010 | Berrigan | |
| 7,858,163 B2 | 12/2010 | Angadjivand | |
| 7,947,142 B2 | 5/2011 | Fox | |
| 8,157,881 B1 * | 4/2012 | Anoszko | B01D 46/0005 55/497 |
| 8,162,153 B2 | 4/2012 | Fox | |
| 9,682,339 B2 * | 6/2017 | Jursich | B01D 46/0005 |
| 2003/0029146 A1 * | 2/2003 | Quigley | B01D 46/0005 55/497 |
| 2003/0066274 A1 * | 4/2003 | Fredrick | B01D 46/0004 55/496 |
| 2003/0066275 A1 * | 4/2003 | Schuld | B01D 46/0004 55/496 |
| 2003/0066424 A1 * | 4/2003 | Shah | B01D 46/0004 95/273 |
| 2003/0066425 A1 * | 4/2003 | Shah | B01D 46/0004 95/273 |
| 2003/0230061 A1 * | 12/2003 | Kubokawa | B01D 46/10 55/486 |
| 2004/0182055 A1 | 9/2004 | Wynn | |
| 2007/0289273 A1 * | 12/2007 | Boyd | B01D 46/0005 55/497 |
| 2009/0186151 A1 * | 7/2009 | Vijayakumar | B01D 39/2024 427/140 |
| 2009/0266041 A1 * | 10/2009 | Schrage | B01D 46/0005 55/498 |
| 2012/0225600 A1 | 9/2012 | Rule | A61L 27/50 442/328 |
| 2012/0272829 A1 * | 11/2012 | Fox | B01D 39/163 96/154 |
| 2012/0317944 A1 * | 12/2012 | Lise | B01D 46/0002 55/499 |
| 2013/0091818 A1 | 4/2013 | Anoszko | |
| 2013/0133301 A1 * | 5/2013 | Sproule | B01D 46/0002 55/480 |
| 2015/0231547 A1 * | 8/2015 | Schrage | B01D 46/525 55/502 |
| 2015/0267927 A1 * | 9/2015 | Zhang | F24F 3/1603 55/493 |
| 2016/0023149 A1 * | 1/2016 | Schouweiler | B01D 39/163 427/244 |

* cited by examiner

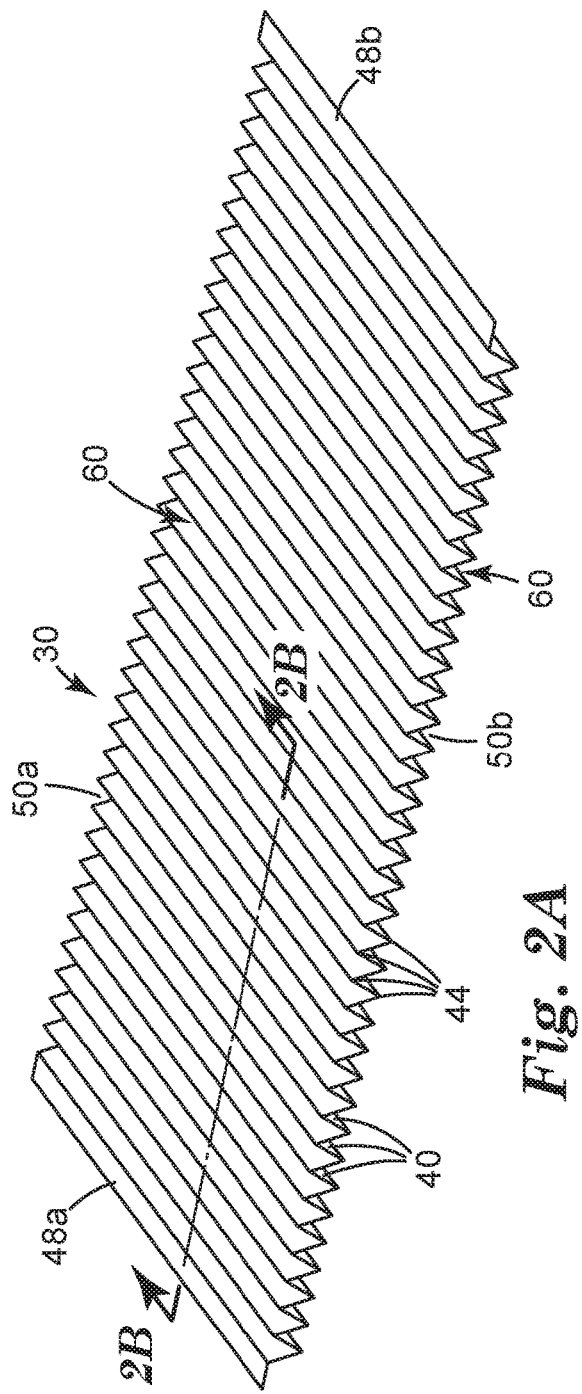
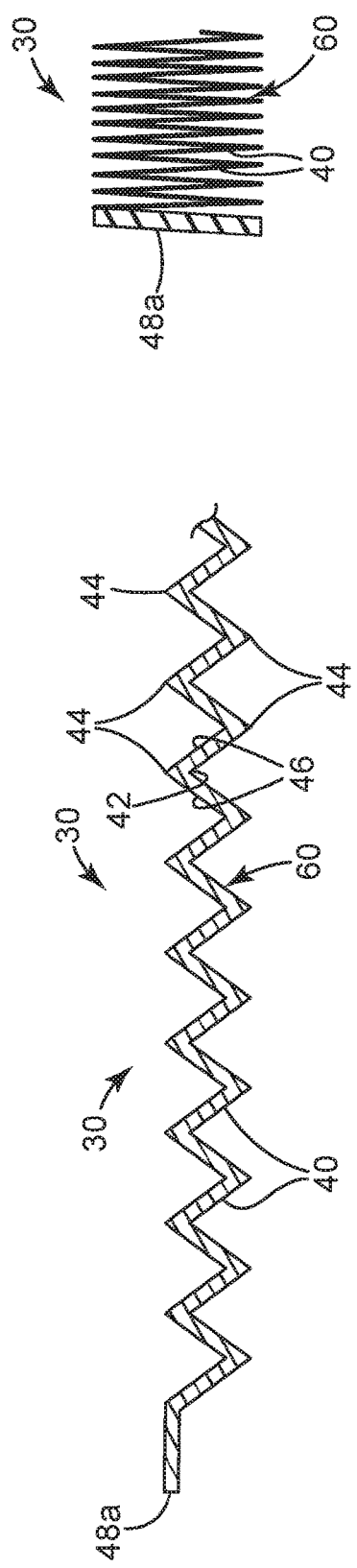
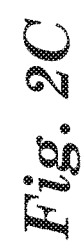

COLLAPSIBLE AIR FILTER

TECHNICAL FIELD

The present disclosure relates to air filters and methods of using and installing those air filters. More particularly, it relates to air filters expandable from a collapsed arrangement to an expanded, end-use arrangement.

BACKGROUND

Disposable air filters are commonly used in forced air systems (e.g., residential heating and air-conditioning systems) in order to remove dust and dirt particles and the like. HVAC air filters typically include a filter media surrounded and supported by a frame. Additional supporting and/or reinforcing components, such as a mesh screen, adhesive beads, etc., may also be included. After a period of use, the filter media becomes dirty or clogged (e.g., loaded with captured particulates), and must be replaced. This is accomplished by replacing the entire air filter. Because the frame (and other reinforcing components where provided) is discarded with the air filter even though it is only the filter media that is no longer functional, there may be unnecessary waste and cost associated with conventional HVAC air filters.

In addition to supporting the filter media, the frame defines a perimeter size and shape of the HVAC air filter, and is normally selected to match the size and shape of the expected end-use application. For example, many residential HVAC systems are configured for use with a "standard" sized air filter of 20"×20"×1" or 20"×25"×1". The rigid frame dictates that the HVAC air filter has this same size as shipped to a retailer, as presented to potential purchasers, and as stored by an end user. Because these typical HVAC air filters are thus rather bulky, they undesirably occupy a relative large volume of space on transportation vehicles and retailer shelves. Further, consumers may view the purchase, handling and storage of the bulky HVAC air filters as less than optimal.

In light of the above, a need exists for a disposable air filter that overcomes one or more of the above-mentioned problems associated with conventional, disposable HVAC air filters.

BRIEF DESCRIPTION OF THE DRAWINGS

FIG. 2A is a perspective view a pleated filter media assembly useful with air filters of the present disclosure and in an expanded condition;

FIG. 2B is a cross-sectional view of the pleated filter media assembly of FIG. 2A, taken along the line 2B-2B;

FIG. 2C is a side view of a portion of the pleated filter media assembly of FIG. 2A in a collapsed condition;

DETAILED DESCRIPTION

Figure 1A:
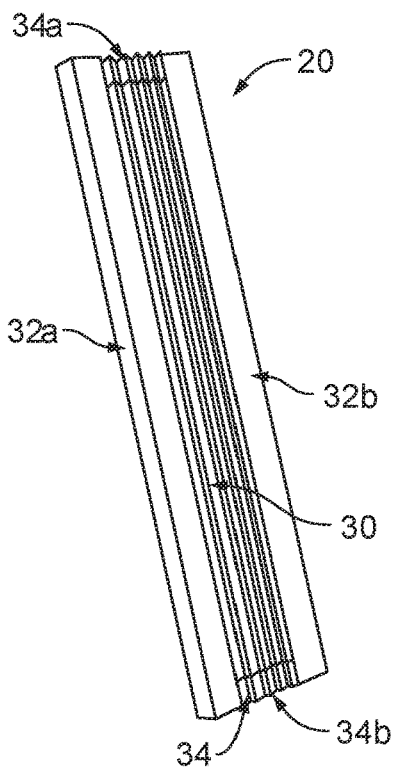
FIG. 1A is a perspective view of an air filter in accordance with principles of the present disclosure and arranged in a collapsed state.
Figure 1B:
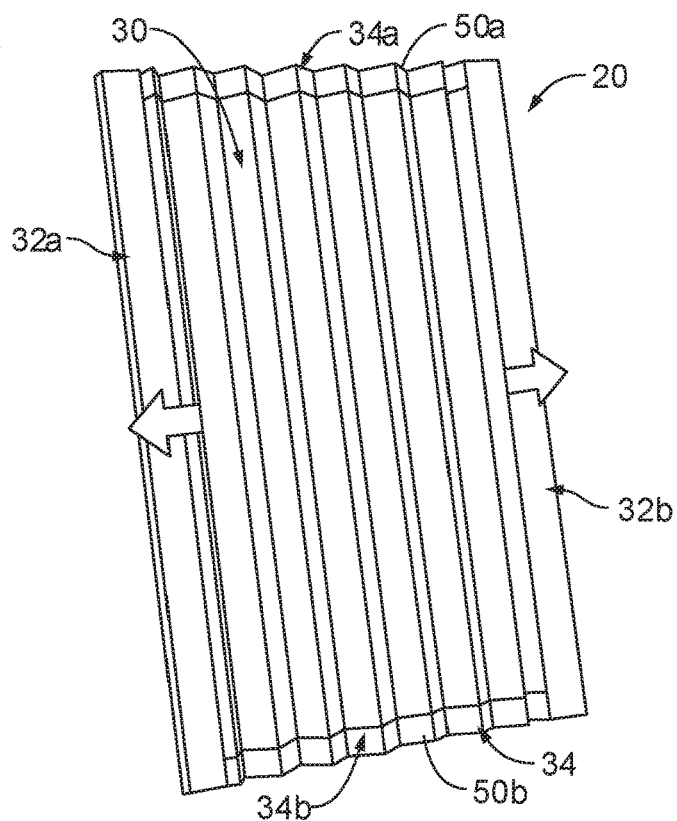
FIG. 1B is a perspective view of the air filter of FIG. 1A in an expanded state.

One embodiment of an air filter 20 in accordance with principles of the present disclosure is shown in FIGS. 1A and 1B. The air filter 20 is generally configured to be expandable by a user from a collapsed, initial state (FIG. 1A) to an expanded, end-use state (FIG. 1B), and to self-retain the expanded state for installation and use within an HVAC system. The air filter 20 includes a pleated filter media assembly 30, opposing end members 32a, 32b, and one or more shape retention structures 34. Details on the various components are provided below. In general terms, the pleated filter media assembly 30 is configured to readily transition between the collapsed and expanded states by directing the end member 32a, 32b toward or away from each other. The shape retention structure(s) 34 is also configured to readily transition between collapsed and expanded states, and further functions to maintain the air filter 20 in at least the expanded state. In some optional embodiments, the shape retention structure(s) is further configured to main the air filter 20 in the collapsed state. In at least some embodiments, the air filter 20 does not require a conventional, rigid frame surrounding the pleated filter media assembly 30, and can be provided in the collapsed state to save space with shipping and display. In some embodiments, the air filter can include a frame that can be later attached or applied to the filter media assembly or air filter.

The pleated filter media assembly 30 can assume a wide variety of forms useful for HVAC air filtration presently known, or in the future developed. As used herein, the term "pleated" refers to a web at least a portion of which has been folded to form a configuration comprising rows of generally parallel, oppositely oriented folds. For example, and as shown in FIGS. 2A and 2B, the pleated filter media assembly 30 includes a plurality of pleats 40 each including a fold line 42 defining a pleat tip 44 and a pair of adjacent panels 46. Materials and construction of the pleated filter media assembly 30 are such that the pleated filter media assembly 30 can be repeatedly transitioned (e.g., several times) between an expanded condition as in FIG. 2B and a collapsed condition as in FIG. 2C in some embodiments (although the shape retention structure 34 (FIG. 1A) can impede or prevent collapsing of the pleated filter assembly 30 from expanded condition as described below). A spacing distance between successive pleat tips 44 in the expanded condition is greater than that of the collapsed condition. As a point of reference, the "expanded condition" of the pleated filter media assembly 30 as an individual component generally corresponds with the "expanded state" of the air filter 20 (FIG. 1B) as a whole (and the "collapsed condition" of the pleated filter media assembly 30 generally corresponds with the "collapsed state" of the pleated air filter 20 (FIG. 1A)), except that the air filter 20 includes additional components (described below) that retain the pleated filter media assembly 30 in the particular size and shape of the expanded state. In other words, while the pleated filter media assembly 30 can be transitioned (e.g., stretched or compacted) to any of a number of different "expanded conditions" and "collapsed conditions", the pleated filter media assembly 30 cannot, in and of itself, self-retain the shape of any one particular condition in some embodiments. The air filter 20, however, as whole can self-retain the shape of the selected expanded state and collapsed state. In other embodiments, the pleated filter media assembly 30 can be configured to self-retain a selected shape or state. The pleated filter media assembly 30 can have the rectangular shape (that is specifically inclusive of a square shape) shown, defining opposing ends 48a, 48b and opposing sides 50a, 50b.

The pleated filter media assembly 30 can consist of a pleated filter media or web 60 alone (as in the illustrated embodiment), or can include one or more additional components or structures applied or assembled to a pleated filter media 60 so long as the resultant pleated filter media assembly 30 can at least be transitioned from the collapsed condition to the expanded condition without damaging a structural integrity of the pleated filter media assembly 30, and optionally can be repeatedly transitioned between the collapsed and expanded conditions without damaging a structural integrity of the pleated filter media assembly 30. The pleated filter media 60 of the assembly 30 can be self-supporting or non-self-supporting. For example, where the pleated filter media assembly 30 consists of the pleated filter media 60 alone, the pleated filter media or web 60 can be self-supporting or non-self-supporting. Where the pleated filter media assembly 30 consists of the pleated filter media or web 60 and a support structure, the pleated filter media 60 can be non-self-supporting with the addition supporting structure rendering the pleated filter media assembly 30, as a whole, to be self-supporting. As used herein, the term "self-supporting" with respect to filter media describes filter media that satisfies at least one of the following conditions: (1) a filter media or web that is deformation resistant without requiring stiffening layers, adhesive or other reinforcement in the filter media web; or (2) the filter media generally maintains its shape when subjected to an airstream as described, for example, in U.S. Pat. No. 7,169,202 to Kubokawa, the entire teachings of which are incorporated herein by reference; or (3) a web or media having sufficient coherency and strength so as to be drapable and handleable without substantial tearing or rupture. As used herein, the term "non-self-supporting" can denote an air filter media that does not satisfy at least one of the above conditions.

Any desired filter media 60 having the desired characteristics can be used in the filter media assembly 30. For example, the filter media 60 can be constructed, for example, from nonwoven fibrous media formed of thermoplastics or thermosetting materials such as polyolefins including polypropylene, HDPE, LDPE, LLDPE and metallocene polyolefins; polyesters including aromatic and aliphatic polyesters, polyamides such as nylon 6, nylon 6,6, nylon 12, etc.; natural fibers including cellulose fibers such as rayon, cotton, and the like, acrylic fibers, olefin copolymers such as EMA, EVA and the like, Teflon, polyurethanes, polyvinyl chloride and combinations thereof. Other suitable, non-limiting materials for the filter media include porous foams, nonwovens, papers, fiberglass, or the like. The pleated filter media assembly 30 can optionally include a highly open wire mesh or screen, one or more adhesive strands, etc., is bonded to the filter media 60 in order to enhance the pleatability thereof and that is pleated along with the filter media 60 itself.

In some embodiments, the filter media 60 comprises a nonwoven web that can have random fiber arrangement and generally isotropic in-plane physical properties (e.g., tensile strength), or if desired may have aligned fiber construction (e.g., one in which the fibers are aligned in the machine direction as described in U.S. Pat. No. 6,858,297 to Shah et al., the teachings of which are incorporated herein by reference) and anisotropic in-plane physical properties. Some or all of the fibers comprising the nonwoven webs useful with the filter media 60 can be multicomponent fibers having at least a first region and a second region, where the first region has a melting temperature lower than the second region. Some suitable multicomponent fibers are described, for example, in U.S. Pat. Nos. 7,695,660, 6,057,256, 5,597, 645, 5,972,808, 5,662,728 and 5,486,410 the teachings of each of which are incorporated herein by reference in their entireties.

Other nonwoven webs useful with the filter media 60 can be a high loft spunbond web, such as described, for example, in U.S. Pat. No. 8,162,153 to Fox et al., the entire teachings of which are incorporated herein by reference. In other embodiments, the filter media 60 can be a low loft spunbond web, such as those described in U.S. Pat. No. 7,947,142 to Fox et al., the entire teachings of which are incorporated herein by reference. In yet other embodiments, nonwoven webs useful with the filter media 60 are generated by other techniques and/or have other characteristics, such as the meltblown nonwoven webs disclosed in U.S. Pat. No. 6,858, 297 to Shah et al. (mentioned above). Other non-limiting example of useful nonwoven web formats include bi-modal fiber diameter meltblown media such as that described in U.S. Pat. No. 7,858,163, the entire teaching of which are incorporated herein by reference.

In some embodiments, an electrostatic charge is optionally imparted into or on to material(s) of the filter media 60. Thus, the filter media 60 can be an electret nonwoven web. Electric charge can be imparted to the filter media 60 in a variety of ways as is well known in the art, for example by hydrocharging, corona charging, etc. (e.g., as described in U.S. Pat. No. 7,947,142 (mentioned above)). In other embodiments, the filter media 60 is not electrostatically charged.

Pleats can be formed in the filter media 60 (or in the pleated filter media assembly 30) using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

Returning to FIGS. 1A and 1B, the end members 32a, 32b are generally configured for mounting to one the ends 48a, 48b (best seen in FIG. 2A), respectively, of the pleated filter media assembly 30, and in some embodiments can be identical or substantially identical. The end members 32a, 32b serve as handle or frame members, promoting user grasping and manipulation of the air filter 20, covering of the ends 48a, 48b of the pleated filter media assembly 30, and a more rigid structure for insertion into, and retention within, the filter receiving housing or bay provided with many residential HVAC systems. In some embodiments, the end members 32a, 32b are constructed of a material commonly used for HVAC filter frames, such as paper, paperboard, plastic, metal, etc. The end members 32a, 32b can each have a length that substantially corresponds with a dimension of the corresponding pleated filter assembly end 48a, 48b, although other dimensional relationships are envisioned. While each of the end members 32a, 32b may encompass a small portion of each of the opposing sides 50a, 50b of the pleated filter media assembly 30, presence of the end members 32a, 32b does not overtly restrict collapsing of the pleated filter media assembly 30. For example, at least a majority, and in some embodiments at least 70%, 80%, 90% or at least 95%, of a length of the opposing sides 50a, 50b are unencumbered by the end members 32a, 32b, allowing the pleated filter media assembly 30 to be condensed into a compact format in the collapsed state (e.g., at least a majority of the pleats 40 (FIG. 2B) of the pleated filter media assembly 30 are free of the end members 32a, 32b).

The shape retention structure(s) 34 can assume a wide variety of forms, and is generally configured to retain the pleated filter media assembly 30 in the selected expanded condition (and thus the air filter 20 in the selected expanded state). In the exemplary embodiment of FIGS. 1A and 1B, two of the shape retention structures 34a, 34b are provided, respective ones of which are mounted or applied to one or both opposing major faces of the pleated filter media assembly 30 in the cross-pleat direction (i.e., contacting or interfacing with the pleats 40 (FIG. 2B) between the end members 32a, 32b) immediately adjacent the sides 50a, 50b, respectively (e.g., the first shape retention structure 34a is located at or immediately adjacent the first side 50a, and the second shape retention structure 34b is located at or immediately adjacent the second side 50b). The shape retention structures 34a, 34b can be identical, and in some embodiments are moldable or deformable edge strips that can be molded and "set" to desired shape (e.g., at room temperature).

For example, the shape retention structures 34a, 34b can be or include a curable composition such as a moisture/water curable composition such as plaster of Paris, cyanoacrylates such as ethylcyanoacrylate, or a water curable isocyanate functional resin such as Scotchcast™ Plus casting tape available from 3M Company of St. Paul, Minn. Suitable isocyanate functional resin systems are disclosed in U.S. Pat. No. 4,667,661 incorporated herein by reference. Additionally, the moisture curable resin could be a silane functional resin such as but not limited to that disclosed in U.S. Pat. No. 5,540,652, the entire teachings of which are incorporated herein by reference. For moisture curable retention means, importantly, moisture is prevented from curing the composition prior to use with appropriate barrier packaging either hermetically enclosing the curable composition or the entire air filter 20. Alternatively, the moisture curable resin could be replaced or augmented with a polymeric dispersion or solution in water or solvent and simple evaporation results in drying such as a latex or lacquer paint resulting in enhanced rigidity.

In other embodiments, the shape retention structures 34a, 34b are made of a deformable metal. For example, the shape retention structures 34a, 34b can be aluminum strips.

While two of the shape retention structures 34a, 34b are shown, other numbers, either greater or lesser, are also acceptable. For example, in other embodiments, the air filter 20 can include one or more additional shape retention structures akin to the shape retention structures 34a, 34b described above, but more centrally located along a length of the pleated filter media assembly 30.

The air filter 20 is initially arranged in the collapsed state (FIG. 1A) in which the pleated filter media assembly 30 is condensed (and held) into a compact media pack. The air filter 20 can be shipped to a retailer, stored at the retailer's place of business, displayed on the retailer's shelves, transported by a purchaser/user, and/or temporarily stored by the user in the collapsed state. At each of the stages, the air filter 20 (in the collapsed state) beneficially occupies a significantly reduced volume (as compared to the expanded state), thereby reducing associated costs and increasing user satisfaction. In some embodiments, the shape retention structure(s) 34 is configured to retain the pleated filter media assembly 30 to a size and shape of the selected collapsed state; in other embodiments, the air filter 20 can include additional components (e.g., outer packaging such as shrink wrap plastic) that "holds" the pleated filter media assembly 30 to the collapsed state (preventing the pleated filter media assembly 30 from self-expanding).

When the user is ready to install the air filter 20 to an HVAC system, the user simply pulls on the two end members 32a, 32b to stretch the pleated filter media assembly 30 to a desired size corresponding with the filter receiving housing or bay of the HVAC system. As a point of reference, where the HVAC system's filter receiving bay is sized and shaped for use with a 20" (width)×25" (length)×1" (depth) air filter, the air filter 20 can have a width on the order of 20" and a depth on the order of 1" in both the collapsed and expanded states, and can be arranged in the expanded state to have a length on the order of 25". However, in the collapsed state, the air filter 20 will have a length much less than 25" (e.g., less than 50% of the length in the expanded state). The shape retention structure(s) 34 is configured to allow desired stretching of the pleated filter media assembly 30. Once the air filter 20 has been stretched to the desired size (e.g., desired length), the shape retention structure(s) 34 secures and holds the pleated filter media assembly 30 to the selected size. For example, with embodiments in which the shape retention structure(s) 34 is a curable moldable material (e.g., Scotchcast™ Plus casting tape or plaster), water or other liquid is applied to the shape retention structure(s) 34, or they are simply exposed to ambient humidity or both, while in the collapsed condition to activate the material of the shape retention structure(s); the so-activated shape retention structure(s) 34 will then readily allow the pleated filter media assembly 30 to be stretched by the to the desired expanded state. The user then holds the air filter 20 in the selected expanded state, allowing the shape retention structure(s) 34 to cure. Once cured, the air filter 20 can be inserted into the HVAC system and will perform to filter contaminants from the HVAC system's airflow. Alternatively where the shape retention structure(s) 34 are a deformable metal, after stretching the pleated filter media assembly 30 to a desired length, the user manipulates the shape retention structure(s) 34 (e.g., squeezing or pressing) to engage the pleats. Regardless, the shape retention structure(s) 34 maintains its strength in the expanded state to ensure the integrity of the air filter 20.

When the pleated filter media assembly 30 becomes clogged or dirty, the air filter 20 is removed from the HVAC system and discarded. Unlike conventional HVAC air filters, the air filters of the present disclosure (such as the air filter 20) do not include frame members along all edges or sides of the pleated filter media assembly 30, thus reducing overall costs and waste.

Figure 3B:
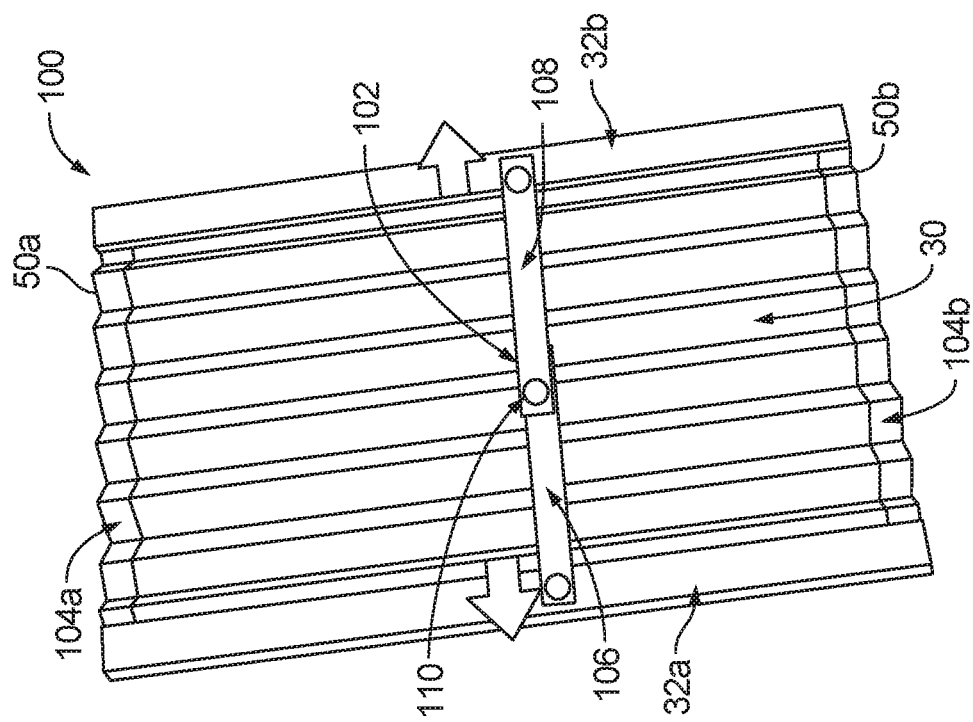
FIG. 3B is a perspective view of the air filter of FIG. 3A in an expanded state.
Figure 3A:
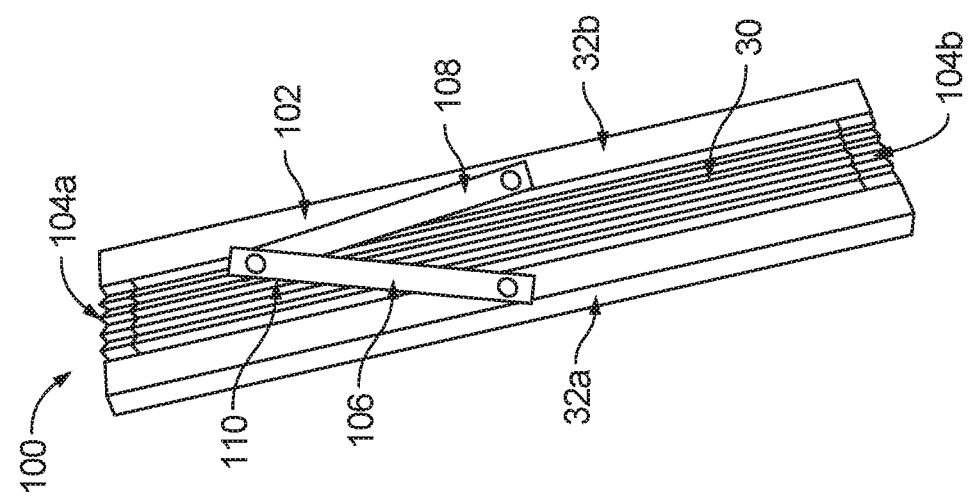
FIG. 3A is a simplified perspective view of another air filter in accordance with principles of the present disclosure and arranged in a collapsed state.

Another embodiment air filter 100 in accordance with principles of the present disclosure is shown in FIGS. 3A and 3B. The air filter 100 is configured to be transitionable from, optionally between, a collapsed, initial state (FIG. 3A) to an expanded, end-use state (FIG. 3B), and to self-retain the expanded state for installation and use within an HVAC system. The air filter 100 is akin to the air filter 20 (FIGS. 1A and 1B), and includes the pleated filter media assembly 30 and the opposing end members 32a, 32b that can assume any of the forms described above. In addition, the air filter 100 includes a primary shape retention structure 102 and one or more optional, secondary shape retention structures 104a, 104b. The primary shape retention structure 102 includes first and second arms 106, 108. The first arm 106 is pivotably coupled to the first end member 32a, and the second arm 108 is pivotably coupled to the second end member 32b. Further, the arms 106, 108 are pivotably coupled to one another at a pivot point 110. The pivotable connections can be accomplished in a wide variety of manners as understood by one of ordinary skill (e.g., pinned coupling, living hinge, etc.). Regardless, the arms 106, 108 readily rotate or pivot relative to one another and relative to the corresponding end member 32a, 32b in transitioning between the collapsed and expanded states. In some embodiments, the primary shape retention structure 102 can include one or more additional components that robustly hold or lock the arms 106, 108 relative to one another in the expanded state (e.g., a clasp that can be slid over the pivot point 110, complimentary protrusion and groove arrangement on the arms 106, 108, etc.). Regardless, the primary shape retention structure 102 is effectively locked in the expanded state and extends in the cross-pleat direction such that the air filter 100 self-retains a size and shape of the pleated filter media assembly 30 in the expanded state, with this size and shape corresponding with the expected size and shape of the filter receiving housing or bay included with the user's HVAC system. Thus, the primary shape retention structure 102 functions to: (1) provide a strong support to the pleated filter media assembly 30 so that the pleats 40 (FIG. 2B) will not deform under air pressure, and (2) locks the air filter 100 to a fixed sized when the primary shape retention structure 102 is fully deployed/expanded.

In some embodiments, an attachment mechanism such as, for example, adhesive, hook and/or loop materials and/or dual lock materials can be provided with at least the arms 106, 108 to hold the pleated filter media assembly 30 in one or both of the collapsed and expanded states. For example, loop material could be added to select regions of the pleated filter media assembly 30. Alternatively, some embodiments of the pleated filter media assembly 30 inherently form "loop" structures along the filter media. Hook material can be added to the filter side of the arms 106, 108. The hook material would engage with the pleat tips in the collapsed state, with the arms 106, 108 thus serving to retain the pleated filter media assembly 30 in the collapsed state. To deploy or articulate the arms 106, 108, the arms 106, 108 are lifted off of the pleated filter media assembly 30, rotated as desired, and then re-attached. Further, the so-constructed arms 106, 108 could be used at the ends of the pleated filter media assembly 30 and collapse toward the center to support the ends.

Where provided, the secondary shape retention structures 104a, 104b can be applied or mounted to the pleated filter media assembly 30 at or immediately adjacent a respective one of the sides 50a, 50b. The secondary shape retention structures 104a, 104b are deformable and can assume various forms that provide support or reinforcement to the pleated filter media assembly 30 at least in the expanded state. For example, the secondary shape retention structures 104a, 104b can be a soft metal. In other embodiments, the secondary shape retention structures 104a, 104b can be any of the formats described above with respect to the shape retention structures 34a, 34b (FIGS. 1A and 1B).

The air filter 100 can initially be in the collapsed state (and thus has a compact volume) during shipping, storage, and/or on the retailer's shelves. The air filter 100 can optionally include additional components (e.g., packaging) that holds the air filter 100 in the collapsed state. When the user is ready to install the air filter 100 to an HVAC system, the user simply pulls on the two end members 32a, 32b to stretch the pleated filter media assembly 30 and articulate the primary shape retention structure 102 to the expanded state of FIG. 3B. The fixed size dictated by the primary shape retention structure 102 in the expanded state corresponds with an expected size of the filter receiving housing or bay of the HVAC system. The air filter 100 is then installed to the HVAC system and functions to remove contaminants from the HVAC system airflow, and can later be discarded as described above.

The air filters of the present disclosure provide a marked improvement over previous designs. The air filters can be collapsed to save shelf-space and transportation space. The collapsed filter can be easily expanded to it usable form, making it easy for end-users to use the air filter. Further, the expanded filter is self-supported, requiring no frame material.

Although specific embodiments of the present disclosure have been shown and described herein, it is understood that these embodiments are merely illustrative of the many possible specific arrangements that can be devised in application of the principles of the present disclosure. Numerous and varied other arrangements can be devised in accordance with these principles by those of ordinary skill in the art without departing from the spirit and scope of the present disclosure. Thus, the scope of the present disclosure should not be limited to the structures described in this application, but only by the structures described by the language of the claims and the equivalents of those structures.

What is claimed is:
1. An HVAC air filter comprising:
a filter media assembly including:
(1) filter media including a plurality of pleats,
(2) first and second opposing sides, and
(3) first and second opposing ends respectively comprising first and second opposing end members mounted thereto; and
a first and second shape retention structures the first shape retention structure being a continuous strip that is mounted to and in continuous contact with, a first major face of the pleated filter media immediately adjacent a first side edge of the pleated filter media and being pleated along with the pleated filter media, the second shape retention structure being a second continuous strip that is mounted to and in continuous contact with, the first major face, of the pleated filter media, immediately adjacent a second, opposing side edge of the pleated filter media and being pleated along with the pleated filter media, the first and second shape retention structures being configured to allow the filter media assembly to expand from a collapsed state to an expanded state and to retain the filter media assembly in the expanded state; and
wherein a spacing distance between adjacent pleats in the filter media is greater in the expanded state of the filter media assembly than in a collapsed state of the filter media assembly,
and wherein the HVAC air filter does not include a perimeter support frame.

2. The HVAC air filter of claim 1, wherein the filter media is self-supporting.

3. The HVAC air filter of claim 1, wherein the filter media is non-self-supporting.

4. The HVAC air filter of claim 1, wherein the filter media is a nonwoven fibrous media.

5. The HVAC air filter of claim 4, wherein the nonwoven fibrous media includes at least one of thermoplastics, thermosetting materials, polyesters, polyamides, natural fibers, acrylic fibers, olefin copolymers, Teflon, polyurethanes, polyvinyl chloride, porous foam, a nonwoven material, paper, fiberglass, and combinations thereof.

6. The HVAC air filter of claim 5, wherein the thermoplastic or thermosetting materials are selected from a group consisting essentially of polypropylene, HDPE, LDPE, LLDPE, and metallocene polyolefins.

7. The HVAC air filter of claim 5, wherein the polyester material is at least one of an aromatic polyester or and aliphatic polyester.

8. The HVAC air filter of claim 5, wherein the polyamide material includes at least one of nylon 6, nylon 6,6, and nylon 12.

9. The HVAC air filter of claim 1 further comprising:
at least one of a wire mesh, a screen, and/or one or more adhesive strands adjacent to the filter media.

10. The HVAC air filter of claim 1, wherein the filter media has an electrostatic charge.

11. The HVAC air filter of claim 1, wherein the first and second end members each include a handle.

12. The HVAC air filter of claim 1, wherein the first and second shape retention structures includes a curable composition.

13. The HVAC air filter of claim 12, wherein the curable composition includes at least one of a moisture/water curable composition, a cyanoacrylate, or a water curable isocyanate functional resin.

14. The HVAC air filter of claim 1, wherein the first and second shape retention structures includes a deformable metal.

15. The HVAC air filter of claim 1, wherein the first and second shape retention structures are secondary shape retention structures and wherein the HVAC air filter further comprises a primary shape retention structure that includes first and second arms wherein the first arm is pivotally coupled to the first end member and the second arm is pivotably connected to the second end member and the first and second arms are pivotably connected to one another.

16. The HVAC air filter of claim 15, further comprising: an attachment mechanism capable of attaching at least one of the first and second arms to the filter media.

17. The HVAC air filter of claim 16, wherein the attachment mechanism is at least one of an adhesive, hook and loop materials, and dual lock materials.

18. The HVAC air filter of claim 16, wherein the attachment mechanism is hook and loop material; the hook material is part of, attached to, or adjacent to at least one of the first or second arms; and the loop material is part of, attached to, or adjacent to at least a portion of the filter media.

19. The HVAC air filter of claim 1, wherein the expanded state of the filter media assembly corresponds with an expected size of a filter receiving housing or bay of an HVAC system.

20. A method of using an air filter of claim 1, comprising:
pulling on the first and second end members to stretch the pleated filter media assembly and articulate the first and second shape retention structures to the expanded state; and
activating or locking the shape retention structure to hold the air filter in the expanded state.

21. The method of claim 20, further comprising:
installing the air filter into an HVAC system.

22. The HVAC air filter of claim 1, wherein the first and second shape retention structures are identical to each other.

* * * * *